United States Patent
Ding et al.

(10) Patent No.: US 12,149,632 B2
(45) Date of Patent: Nov. 19, 2024

(54) QUANTUMPROOF BLOCKCHAIN

(71) Applicant: Jintai Ding, Cincinnati, OH (US)

(72) Inventors: Jintai Ding, Cincinnati, OH (US); Yangxing Ding, Cincinnati, OH (US)

( * ) Notice: Subject to any disclaimer, the term of this patent is extended or adjusted under 35 U.S.C. 154(b) by 0 days.

(21) Appl. No.: 18/328,549

(22) Filed: Jun. 2, 2023

(65) Prior Publication Data

US 2023/0318843 A1    Oct. 5, 2023

Related U.S. Application Data

(62) Division of application No. 18/067,509, filed on Dec. 16, 2022, which is a division of application No. 16/758,300, filed as application No. PCT/US2018/054440 on Oct. 4, 2018, now Pat. No. 11,570,003.

(60) Provisional application No. 62/684,848, filed on Jun. 14, 2018, provisional application No. 62/593,741, filed on Dec. 1, 2017, provisional application No. 62/567,879, filed on Oct. 4, 2017.

(51) Int. Cl.

| | |
|---|---|
| H04L 9/32 | (2006.01) |
| G06N 10/00 | (2022.01) |
| G06Q 20/06 | (2012.01) |
| G06Q 20/38 | (2012.01) |
| G06Q 20/40 | (2012.01) |
| H04L 9/00 | (2022.01) |
| H04L 9/08 | (2006.01) |
| H04L 9/30 | (2006.01) |

(52) U.S. Cl.
CPC ........... *H04L 9/3242* (2013.01); *G06N 10/00* (2019.01); *G06Q 20/401* (2013.01); *H04L 9/3093* (2013.01); *H04L 9/3247* (2013.01); *G06Q 2220/00* (2013.01); *H04L 2209/56* (2013.01)

(58) Field of Classification Search
CPC ... H04L 9/3242; H04L 9/3093; H04L 9/3247; H04L 9/3026; H04L 9/3239; H04L 9/3236; H04L 9/006; H04L 9/0852; H04L 9/50; H04L 2209/56; G06N 10/00; G06Q 20/401; G06Q 20/065; G06Q 20/3827; G06Q 2220/00
See application file for complete search history.

(56) References Cited

U.S. PATENT DOCUMENTS

| | | |
|---|---|---|
| 10,552,138 B2 | 2/2020 | Smith et al. |
| 11,455,630 B2 * | 9/2022 | Wright ............... G06Q 20/3823 |
| 2014/0108786 A1 | 4/2014 | Kreft |

(Continued)

FOREIGN PATENT DOCUMENTS

| | | |
|---|---|---|
| WO | WO 2017/145002 A1 | 8/2017 |
| WO | WO 2019/202314 A1 | 10/2019 |

OTHER PUBLICATIONS

Implementation of Elliptic Curve Digital Signature Algorithm (ECDSA), by Abidi et al., published 2014 (Year: 2014).

(Continued)

*Primary Examiner* — Vu V Tran
(74) *Attorney, Agent, or Firm* — Frost Brown Todd LLC

(57) ABSTRACT

Bitcoins and the underlying blockchain technology are one of the main innovations in building decentralized applications. The effects of quantum computing on this technology are analyzed in general. Provided herein are effective solutions to address security vulnerabilities in a blockchain-based system that can be exploited by a quantum attacker.

11 Claims, 3 Drawing Sheets

(56) References Cited

U.S. PATENT DOCUMENTS

| | | | |
|---|---|---|---|
| 2015/0106616 A1* | 4/2015 | Nix | H04W 12/40 |
| | | | 713/170 |
| 2016/0080156 A1 | 3/2016 | Kaliski, Jr. | |
| 2016/0085955 A1 | 3/2016 | Lerner | |
| 2016/0342977 A1 | 11/2016 | Lam | |
| 2017/0180134 A1* | 6/2017 | King | H04L 63/0876 |
| 2018/0101684 A1* | 4/2018 | Murphy | G06F 21/64 |
| 2018/0183602 A1 | 6/2018 | Campagna et al. | |
| 2019/0050541 A1* | 2/2019 | Wright | H04L 9/0637 |

OTHER PUBLICATIONS

European Patent Application No. 18863967.8; Extended Search Report; dated Sep. 22, 2021; 19 pages.

Todd Peter; "Stealth Addresses"; SourceForge; https://sourceforce.net/bitcoin/mailman/message/31813471/; Jan. 2014; accessed Jul. 20, 2021; 6 pages.

Azouvi et al.; "Who Am I? Secure Identity Registration on Distributed Ledgers", 17th Int'l Conf. on Image Analysis and Processing; Sep. 2017; p. 373-389.

"Transaction"; https://www.blockchain.com/btc/tx/21915863fa124d1cc1b3887152570704dbe18ec1db9621cbe79a98c719ae6d1; Blockechain; Jul. 2012; accessed Jul. 7, 2021; 5 pages.

Rodenburg et al.; "Blockchain and Quantum Computing"; Mitre Technical Report; MTR170487; Jun. 2017; 16 pages.

Blecher; "Transaction"; https://en.bitcoin.it/w/index.php?title=Transaction&olid=63712; Wikipedia; Jul. 2017; accessed Jul. 20, 2021; 6 pages.

Satoshi Nakamoto; "Bitcoin: A Peer-to-Peer Electronic Cash System"; Oct. 2008; XP055547572; 9 pages.

Dockrill "Scientists Claim to Have Invented the World's First Quantum-Proof Blockchain.", Science alert article, May 31, 2017 (May 31, 2017) Retrieved from entire document International Search Report from PCT/US2018/054440; dated Jan. 31, 2019.

European Patent Application No. 18863967.8; Partial Search Report; dated Jun. 1, 2021; 8 pages.

\* cited by examiner

QUANTUMPROOF BLOCKCHAIN

CROSS-REFERENCE TO RELATED PATENT APPLICATION

The present application is a divisional application of, and claims priority to U.S. patent application Ser. No. 18/067,509, "Quantumproof Blockchain," filed on Dec. 16, 2022, which is a divisional application of U.S. patent application Ser. No. 16/758,300, "Quantumproof Blockchain," filed on Apr. 22, 2020, which is the National Stage of International Application No. PCT/US2018/054440, filed Oct. 4, 2018, which claims priority to United States Provisional Application Nos. 62/684,848, "Quantumproof Blockchain," filed on Jun. 14, 2018, U.S. Provisional Application No. 62/593,741, "Quantumproof Blockchain," filed on Dec. 1, 2017, and U.S. Provisional Application No. 62/567,879, "Quantumproof Blockchain," filed Oct. 4, 2017, which are incorporated herein by reference in their entireties for any and all purposes.

TECHNICAL FIELD

The disclosed inventions are in the field of blockchain technologies and cryptocurrencies.

BACKGROUND

Cryptocurrencies have been growing in importance in recent years due to many desirable features. Although bitcoin is popularly considered the first cryptocurrency, some other currencies include ethereum, which focuses on smart contracts, and litecoin, which is a branching of the bitcoin chain and performs faster generation of blocks. Bitcoins (and other cryptocurrencies or "coins") enable transactions between entities and individuals without the need for a centralized authority by using the concept of blockchains.

Instead of a centralized authority that is responsible for validating and maintaining a ledger of all transactions, a blockchain relies on a network of nodes to perform these operations. When a new transaction is posted to the network, the transaction is validated by solving a computationally intensive task, known as a Proof of Work (PoW), which may also be referred to as a Proof of Stake (PoS). A block is created from the PoW to represent the transaction, and the block is added to a chain of blocks representing previous transactions. The reliability of the PoW arises from the computational intensity of the task, meaning that for a malicious user to cheat (e.g., double spend or steal coins), the user would need to have computational power more than the combined computational power of the network to recreate the blocks of the chain with his malicious transactions.

In addition to the positive security aspects of the blockchain infrastructure, bitcoins benefit from the limited number of coins that can be brought into the system. Bitcoins have a bound of 21 million on the total number of coins that can be generated. The complexity of the proof of work aids in generating a stable supply of the currency. Bitcoins are already being accepted as a mode of payment by many retailers, including Dell, PayPal, Overstock, and Expedia. Recently, Japan has made bitcoin a legal form of payment in the country. Following the success and popularity of bitcoins, the underlying blockchain technology is also studied intensively for other useful applications such as arts, file sharing, and decentralized DNS services, among other uses.

The Bitcoin white paper was first published by an anonymous author under the name Satoshi Nakomoto. It provides details on using a digital signature and proof of work for a self-contained payment system, where the proof of work is used to restrain users from double spending the currency. Even though Bitcoin claims that users will have anonymity, there has been a lot of work to deanonymize users by mapping network and/or email addresses to bitcoin users. Such mapping may occur via post transaction processes required by some bitcoin retailers. For example, some retailers may require users to send an email after a transaction is posted for follow up services (e.g., as in the case of a purchase or donation).

Another effort to de-anonymize users is successful when a public key is reused for multiple transactions. A transaction includes an input, an output, and a target bitcoin address to which bitcoins are sent. This output amount is marked as unspent until the user with the public key hash decides to spend the coins. In order to spend the coins, the user has to publish the new transaction signed with the user's private key and the full unhashed public key for the network of nodes to validate the transaction.

Research on address clustering has attempted to map Bitcoin users with addresses by creating partitions of sets of addresses that are possibly controlled by the same entity in bitcoin transactions. Researchers have been able to identify 69% of the addresses in vulnerable wallets using various heuristics. One of the main reasons that such methods are effective in identifying users is because a new key pair is not generated for each transaction. The need to create a fresh key pair for every transaction to ensure privacy has been emphasized in the original Bitcoin paper (and also in other sources), but such advice is not always followed. This could prove to be even more disastrous when quantum computers are available, allowing a quantum adversary to steal coins by manipulating the network in multiple ways.

Quantum effect: Many classical cryptographic algorithms used on the internet ensure security based on the hardness of number theoretic problems such as the Large Integer Factorization Problem and the Discrete Log Problem, and as described above, Shor's algorithm can solve these problems with quantum computers in polynomial time. The algorithm relies on a quantum period finding routine that can be used to solve both number factorization and discrete log problems. In 2001, IBM successfully experimented with Shor's algorithm using a 7-qubit quantum computer to factor the number 15 into the numbers 3 and 5. Following the IBM experiment, there has been more work on implementing Shor's algorithm, such as factoring the number 15 using solid state qubits and experiments to factor the number 21.

In August 2015, the National Security Agency (NSA) announced its plans to transition to quantum resistant cryptographic primitives for its suite B algorithms. Following the announcement, the National Institute of Standards and Technology (NIST) has been in the process of standardizing quantum resistant cryptographic primitives. The effort to develop quantum-resistant technologies, and in particular post-quantum cryptosystems, is becoming a central research area in information security.

SUMMARY

Systems and methods are described herein for securely signing a blockchain transaction, which may comprise hashing the blockchain transaction to generate a string of hashed bits, wherein a length of the string of hashed bits is a predetermined number, generating a private key comprising pairs of random numbers, wherein a number of the generated pairs is determined by the predetermined number and wherein each generated pair corresponds to a bit of the string of hashed bits, hashing the random numbers of the private key to generate a public key, and for each hashed bit of the string of hashed bits, selecting a random number of the corresponding pair of random numbers, concatenating each selected random number to generate a signature, and associating the hashed bits, the signature, and the public key with the blockchain transaction. The predetermined number may be 256. Each random number may comprise a string of bits having a length of the predetermined number. The selected random number of the corresponding pair of random numbers may be selected based on a value of the hashed bit.

Systems and methods are also described herein for generating a blockchain transaction for a fixed public/private key pair, which may comprise appending a plurality of random bits to the fixed public key to generate a padded public key, storing the plurality of random bits, generating, using the padded public key, a blockchain address, generating the blockchain transaction using the fixed public key and the plurality of random bits as input, and signing the blockchain transaction using the fixed private key and the blockchain address. Generating the blockchain address may comprise generating an encoding of a version of the blockchain, hashing the padded public key, and generating a checksum for the encoding of the version and the hashed padded public key.

Systems and methods are also described herein for generating, using a fixed public/private key pair, a blockchain transaction for an associated blockchain, wherein the blockchain has an associated hash table comprising a plurality of public keys and corresponding hash values. The method may comprise appending a plurality of random bits to the fixed public key to generate a padded public key, storing the plurality of random bits, generating, using the padded public key, a blockchain address, generating the blockchain transaction using the plurality of random bits as input, signing the blockchain transaction using the fixed private key and the blockchain address, and associating the blockchain transaction with an entry in the hash table corresponding to the fixed public key. The fixed public key may be associated with a public key infrastructure (PKI) certificate. The blockchain transaction may be associated with such a PKI certificate. The blockchain address may also be associated with the PKI certificate.

Systems and methods are also described herein for maintaining a blockchain hash table comprising a plurality of public keys and corresponding hash values, wherein each public key of the plurality of public keys is fixed and associated with a single user, and for each blockchain transaction, determining a public key used to generate the blockchain transaction, and associating, in the blockchain hash table, the blockchain transaction with the public key. The systems and methods may further comprise determining that a blockchain transaction comprises malicious activity, determining a public key used to generate the blockchain transaction, and associating, in the blockchain hash table, the malicious activity with the public key.

Systems and method are also described herein for maintaining a public key infrastructure comprising a plurality of certificates, wherein each certificate of the plurality of certificates is fixed and associated with a single user, receiving a plurality of blockchain transactions, and for each blockchain transaction, determining a certificate used to generate the blockchain transaction, and associating the blockchain transaction with the certificate. The systems and methods may further comprise maintaining a trust score associated with each certificate. The systems and methods may also determine that a blockchain transaction comprises malicious activity, determine a certificate used to generate the blockchain transaction, and change a trust score associated with the certificate based on the malicious activity.

Systems and methods are also described herein for generating a new block associated with a blockchain transaction comprising generating a system of m random quadratic polynomials $F_i(x_1, \ldots, x_n)$, $i=1, \ldots, m$, in a finite field in a predetermined number of n unknown variables, wherein the quadratic polynomials are of the form $\Sigma a_{ij}x_ix_j + \Sigma b_ix_i + c$, wherein $a_{ij}$, $b_i$, and c are random values from the finite field and wherein $x_1, \ldots, x_n$ denote the predetermined number of unknown variables, embedding data of the blockchain transaction into quadratic, linear and constant terms, $a_{ij}$, $b_i$, c of the generated system of random quadratic polynomials $F_i(x_1, \ldots, x_n)$, $i=1, \ldots, m$, solving the system $F_1(x_1, \ldots, x_n)=0$, $F_2(x_1, \ldots, x_n)=0, \ldots, F_m(x_1, \ldots, x_n)=0$, certifying validity of the transaction using a solution of the system, and generating the new block.

DETAILED DESCRIPTION OF ILLUSTRATIVE EMBODIMENTS

Figure 1:
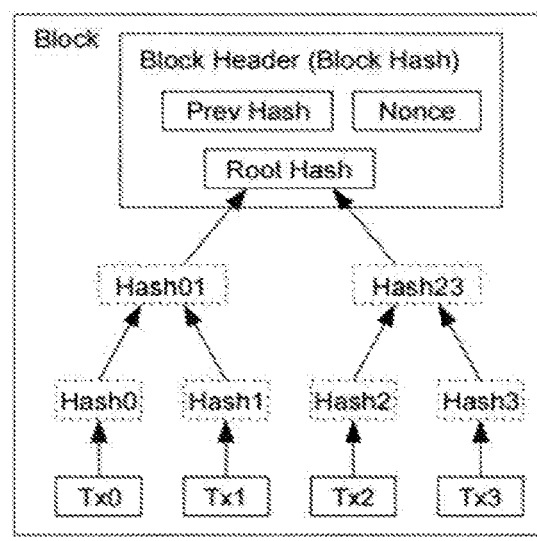
FIG. 1 shows an example Merkle Root of transactions.

With the current momentum gained by Bitcoin, it becomes necessary to analyze and understand the security of bitcoins and other cryptocurrencies (or "coins") in their current states and into the future. Cryptographic algorithms used today are secure based on hardness of mathematical problems that cannot be solved in polynomial time by a classical computer, but this assumption changes with the existence of a quantum computer. At present, the digital signature algorithm used in Bitcoin is an Elliptic Curve Digital Signature Algorithm (ECDSA), described below, with secp256k1 curve that has its security based on the Discrete Log Problem. With the help of quantum computers, Shor's algorithm is known to solve the discrete log problem in polynomial time, hence breaking the security of ECDSA, consequently affecting bitcoins. Another concern with bitcoins is address reuse, which may be exploited to deanonymize bitcoin users because transactions are publicly broadcasted. Transactions corresponding to a specific address may be tracked to reveal the identity of the user address. Described herein are an analysis of the security of bitcoins with quantum computers, an analysis of the effect of key reuse in post quantum setting, and solutions for security against such threats. For example, the current Proof of Work (PoW) in Bitcoin using hashing functions is not flexible and gives too much power to users with string Application-Specific Integrated Circuit (ASIC) machines. A new PoW is introduced to address these and other problems. Though bitcoins are used as an example cryptocurrency for the systems and methods described herein, the described systems and methods may apply equally to other cryptocurrencies using mechanisms similar to those used in Bitcoin.

Preliminaries

Digital signatures are at the core of blockchains for validation of transactions and for maintaining a network of nodes in consensus. The basic algorithm for elliptic curve digital signatures is described below.

Definition 1. Elliptic Curve: An Elliptic curve E is the set of solutions to the Weierstrass equation, $$E: Y^2 = X^3 + aX + b$$

with a point O, where the constants a and b satisfy $4a^3 + 27b^2 \neq 0$.

For use in cryptography, Elliptic curves are defined over a finite field $F_p$, for a prime p. $E(F_p)$ forms a group with the addition operation defined using the chord and tangent rule, as known in the field. The parameters for ECDSA are a base field size, an elliptic curve, and a base point G, usually represented as (p, a, b, G, n, h), where p refers to the size of the finite field, a and b define the curve $Y^2 = X^3 + aX + b$, G is a base point in the curve, n is the order of G, and h is the cofactor defined as $\#E(F_p)/n$. The order of point G is chosen in such a way to avoid known attacks on the Elliptic Curve Discrete Log Problem. Then the ECDSA algorithm is as follows: The keypair generation for the ECDSA includes generating a d∈[1, n−1], where n is the order of the base point G. Compute P=dG, then P is the public key and d is the private key. The secp256k1 curve used in Bitcoin generates private keys of size 256 bits and compressed public keys of size 264 bits. Compressed public keys store only the x coordinate of the key because the y coordinate can be derived if the curve is known, hence compressing the size by half. The following processing describes how to calculate a signature for a given message and how to verify a given signature.

Signature:

Let m be the message.
1. Select a random k from [1, n−1].
2. Compute $P_1 = kG$, where G is the base point.
3. Calculate $r = x_{P_1} \mod n$, where $x_{P_1}$ is the x co-ordinate of the point $P_1$. If r=0, then go to step 1.
4. Compute e=Hash(m) and $s = k^{-1}(e + rd) \mod n$. If s=0, then go to step 1.

Then, the Signature of the message m is (r, s). So using the secp256k1 curve, the signature size is approximately 512 bits.

Verify: Given the signature (r, s) of a message hash e and the public key of the signer P, following the steps below verifies whether the signature is valid:
1. Calculate $u_1 = es^{-1} \mod n$ and $u_2 = rs^{-1} \mod n$.
2. Compute $P' = u_1 G + u_2 P$. Reject the signature if P'=O. The signature is accepted if $r = x_{P'} \mod n$, where $x_{P'}$ is the x co-ordinate of the point P'.

The Elliptic Curve Discrete Log Problem is to find the private key d of the signer given the public key P=dG. It should be appreciated that if d is known, then anyone can sign a given message m, compromising the authenticity of the signer. Because the discrete log problem over the elliptic curve group is considered to be a hard problem with classical computers, ECDSA is believed to be secure.

Blockchain and Use of Blockchain in Bitcoin

Below are definitions related to blockchains for a clearer understanding of the working of bitcoins. Blockchains are a public ledger of all transactions that have ever been executed on the participating network of nodes. Maintaining a public record of the transactions enables one to validate and protect against attacks like double spending without the use of a trusted third party (e.g., a bank). Apart from cryptocurrencies, blockchains seem to have the potential for a wide range of applications from blockchain internet of things (IoT) to programmable self-executing contracts.

Definition 2. Input: The input to a transaction includes the transaction Id, index of the output being spent by the sender and the input script.

Definition 3. Output: The Output refers to the amount of bitcoins being transferred to the receiver, along with the change amount or transaction fees. Each output has an index number to be referenced when it is spent as input in a future transaction. The output includes the amount of bitcoins being spent and the output script.

Definition 4. Transaction: A transaction is a collection of transaction version number, input, output and the hashed public key of the receiver, full unhashed public key of the sender corresponding to the public key hash of the unspent transaction being spent, signature with the corresponding private key of the sender. A unique transaction identifier is generated for every transaction in the blockchain, which is the hash of the transaction.

Definition 5. Genesis Block: This is the first block of a blockchain, usually assigned block number 0 and is hard-coded into the bitcoin software. This is the first block created by the founder Satoshi Nakamoto and includes a transaction that assigns 50 bitcoins to an address.

Definition 6. Coinbase transaction: This is the bitcoin generating transaction of a block. This transaction assigns to the miner of the block with bitcoins that amount for the reward (currently $12:5) and the transaction fees of all transactions included in the block.

Bitcoin uses a scripting system that is stack based for handling transactions. In the above definition, the hashed public key of the receiver in the transaction is usually included in the output script along with a set of machine level codes for validation required when the recipient decides to spend his coins and the signature and unhashed full public key of the sender is included in an input script. Also, when transactions are hashed to be added to a block (defined below), they are hashed into a Merkle root to save storage space. The Merkle root is derived by hashing each pair of transactions in the block until only one hash value remains, as shown in FIG. 1.

Definition 7. Block: A block header comprises a block version, a hash of the previous block's header (thus forming a chain), transaction Merkle root, time, target bits and a nonce. The target bits is a threshold value that the hash of the block header must be less than or equal to and is used to determine the difficulty level of mining the block. A block includes the block header, number of transactions and the transactions.

Definition 8. Bitcoin address: The bitcoin address of a user is a base58 encoding of the (version, hash160 of public key, checksum for the hash). The checksum is computed as the first four bytes of the SHA256 algorithm applied twice on the hashed public key. The hash160 of public key is the RIPEMD160 hash algorithm applied on a SHA256 of the public key.

An overview of how bitcoins are exchanged using the underlying blockchain concept is helpful when considering some of the security issues apparent when transitioning to quantum computers. A bitcoin user generates a public/private key pair for the ECDSA algorithm used for signature and can create a transaction receiving or spending coins with his bitcoin address.

For a peer transfer of bitcoins from a sender to receiver, the receiver creates a public/private key pair and gives the corresponding bitcoin address to the sender. The sender creates a transaction as defined above, and signs it with the sender's private key. The transaction is then broadcast to the network of nodes and is validated. When the receiver decides to spend the coins (transfer to another user address), the receiver publishes his full public key and a signature of the new transaction. Thus, a receiver with unspent transaction outputs (i.e., available bitcoin balance) cannot spend the bitcoins if the receiver loses his secret key. Because there is no centralized authority involved to validate a transaction, the validation process is performed by the nodes in the network and a transaction is accepted only when a majority of the nodes in the network verify the signature and accept that the sender owns the bitcoins being transferred and that they have not been used in a previous transaction. This is done using a concept called Proof of Work (PoW). In order to create a new block in the chain, the nodes work towards finding a nonce value such that the hash of the previous block, the transactions to be added and nonce is less than or equal to the target threshold value. The reward for doing this work is a fixed number of bitcoins that is generated as the coinbase transaction in the new block and assigned to the block miner. The transactions are timestamped in the network by hashing them into an ongoing chain of hash based proof of work, with the difficulty of the proof being adjusted periodically depending on the rate at which the blocks are generated. The proof of work helps prevent double spending because, to modify a transaction, a malicious user would need to modify the block in which the transaction is included, thereby having to perform the work needed to create the block and the blocks in the chain following the modified transaction block. This is unlikely to happen as long as honest nodes dominate the network's CPU power. A summary of the Bitcoin system is as follows:

1. New transactions are broadcast to all nodes.
2. Each node collects new transactions into a block.
3. Each node works on finding a difficult proof-of-work for its block.
4. When a node finds a proof-of-work, it broadcasts the block to all nodes.
5. Nodes accept the block only if all transactions in it are valid and not already spent.
6. Nodes express their acceptance of the block by working on creating the next block in the chain, using the hash of the accepted block as the previous hash.

Effect of Quantum Computers on Bitcoin

Below is an analysis of the scope of bitcoins with the existence of quantum computers, and potential problems are identified that need to be resolved for safe use of the currency, and similar currencies, in a post quantum setting. Even with quantum computing, hash functions and symmetric key cryptography is still believed to be secure, and hence the bitcoin address generation and proof of work can be assumed to be secure in a post quantum setting. Listed below are example use cases where an attacker can exploit quantum computing in the context of bitcoins. Though, bitcoins are used as an example cryptocurrency, the following use cases may apply equally to other cryptocurrencies.

DDoS with quantum attackers: The transactions and blocks in a bitcoin system are propagated using a peer-to-peer network. When a user has a new transaction or block, he sends an inv message to his peer nodes, which is followed by a GetData or GetBlocks message by the peer nodes that want to download the new information from the user.

An attacker can perform a DDoS (Distributed Denial of Service) attack on any user node that has sent an inv message after receiving the new information. In this case, the victim node cannot interact with the network to validate his original transaction. Instead, the attacker node modifies the original transaction information received from the victim node to send bitcoins to himself by computing the private key corresponding to the public key of the bitcoins being spent in the original transaction. Although the proof of work is computationally intensive and restrains malicious users from cheating to double spend, if the DDoS attack is long enough for the attacker's transaction to be validated and added to a block, the attacker succeeds in stealing the user's bitcoins.

In the case of the DDoS attack, by blocking a user node that posts a transaction, and with the ability to derive the private key corresponding to the user's public key used in the transaction, a quantum malicious user can impersonate the honest user node and create a new transaction spending the bitcoins. A new transaction takes an average of 10 minutes to be confirmed (i.e., added to a block). In general, transactions with lower transaction fees take longer to be confirmed as the reward to mine a block to add the transaction is lesser. Thus, if an attack can be performed for as long as it takes to mine a block, the attacker is successful in stealing the bitcoins.

Such a DDoS attack can also be replaced by an eclipse attack, as is known in the field, without the victim node realizing that only a modified transaction is being broadcast to the actual bitcoin network. Hence, the eclipse attack is more effective.

Key Reuse: With key reuse, it should be appreciated that stealing bitcoins becomes even easier for quantum attackers. It allows attackers to create malicious transactions stealing bitcoins without having to perform a DDoS or eclipse attack on the victim node, thus making the attack more efficient. This is again because the full unhashed public key of an address is revealed when the user spends his available set of coins for that address. A quantum attacker in the network would have access to this public key that can be used later to create transactions in the case when addresses are reused. Because all the transactions are public, the malicious user can track the bitcoins available for each reused address and create transactions to transfer them to his address if he can compute the corresponding private key. Because Shor's algorithm can be used to solve the discrete log problem in polynomial time, the bitcoin addresses can be broken to find the corresponding private keys if a malicious user has access to the public key of his bitcoin address.

Even in the current state of the bitcoin system, key reuse allows for deanonymizing users by tracking and identifying patterns of spending from the publicly broadcasted transactions. However, it becomes a major security vulnerability when quantum computers exist.

New Countermeasures to Resist Quantum Computer Attacks

In a post quantum world, significant changes to the bitcoin system are needed for secure transactions. Key reuse in transactions breaks the anonymity of users and may lead to stealing of bitcoins by malicious users with quantum computers. Solutions, as described herein, include the use of a quantum resistant signature replacing ECDSA and the use of padding with a fixed public key to generate a fresh public key for each transaction. Padding may provide the advantage of storing a single fixed private key while still being able to generate and use new addresses for each transaction.

Post-Quantum Cryptography

One approach to avoid quantum attacks in the bitcoin system is to replace ECDSA with available quantum resistant signature schemes. With the search for quantum resistant primitives intensifying in recent days, it is necessary for quantum resistant algorithms to be used in the bitcoin system for bitcoins to be considered as a reliable payment system for the future. Although the approach seems straightforward, the implementation needs more analysis. In order to understand a possible transition to a post quantum bitcoin system, the concept of bitcoin forks is described. A fork in the bitcoin blockchain is a branching of the blockchain with different user nodes following one of the branches. It can be classified into three cases:
1. Accidental forks: These are forks that occur when two blocks are mined at the same time. This is eventually corrected, with the chain with higher depth accepted and the other one being orphaned. This is not of much concern with bitcoin users as it is automatically corrected with the mining of a few more blocks after the fork.
2. Soft forks: This is a fork in the block chain when non-upgraded nodes (i.e., those nodes not following new consensus rules) still accept upgraded nodes but the converse is not true. So, a soft fork is backward compatible and resolved when all the nodes upgrade to the new consensus rules. This is usually preferred to making changes to rules as it has lesser impact on the bitcoin system.
3. Hard forks: This is a permanent divergence in the bitcoin system with the users owning two copies of their coins for each branch of the block chain. Here, the upgraded nodes accept the blocks created by non-upgraded nodes and the non-upgraded nodes reject the blocks created according to the new rules. Thus if the old nodes do not agree to the new rules, the fork is never resolved. There are altcoins (i.e., cryptocurrencies that are not bitcoins) such as Litecoin that were created as a result of forking from the bitcoin blockchain. Another hard fork occurrence is in the Ethereum cryptocurrency system, now split as Ethereum and Ethereum Classic.

The argument can be made that, because post quantum primitives are the future, the post quantum fork would attract more hashing power and building on the chain of blocks. As an alternative, the post quantum system could start as a new currency system without having to fork the bitcoin chain and could prove to be more promising than Bitcoin itself.

There are potential quantum resistant signature algorithms that are efficient, from Multivariate and Lattice based cryptography. Some of the most efficient hash based schemes include the XMSS (Extended Merkle Signature scheme) and a multi tree version of XMSS. The public key sizes range from 7 kiloBytes (kB) to 14 kB. However, this signature scheme had a disadvantage due to the fact that it needs to manage a global state to make sure that signatures cannot be forged if the same keys are used to sign multiple messages. A stateless signature scheme named SPHINCS has been proposed, but this is less efficient and has larger signature size. The disadvantage to this change in digital signature algorithm would be the key sizes. ECDSA allows for short 256-bit keys while most of the quantum resistant signature algorithms require comparatively larger key sizes. Described below are candidates for replacement in the bitcoin system and their key sizes.
1. Rainbow: This is a multivariate signature scheme that is efficient and provides fast signature and verification. The following parameters may be secure: the underlying field to be GF(31), the signature size is around 456 bits, close to the ECDSA signature size and the public key size range around 138 kB.
2. Lattice signatures: Some of the efficient lattice based signatures include ring-Tesla, BLISS, and GLP. The ring-TESLA signature has its security based on the hardness of the Ring Learning with Errors (RLWE) problem and has public key size around 1-2 kB and larger signature size 12544 bits. This signature scheme has parameters for a provable secure instantiation and performs comparably with other lattice based signature schemes, such as BLISS and GLP.

As the key sizes are larger in the above cases, the transaction size would also increase as a consequence because the unhashed full public key and signature of the spender are included while spending bitcoins. The block size is determined as sum of the size of the block, size of the number of transactions in the block and the size of the transactions in the block. Because transaction sizes increase when the signature algorithm is replaced with a quantum resistant alternative, it consequently affects the block size. Currently, there is a 1 MB limit on the size of the block and much support for increasing the block size limit. With the replacement of ECDSA with one of the quantum resistant signatures listed above, the increase in block size would be justified to allow for a reasonable number of transactions to be included in a block.

Dual Signature Systems

Described herein is a dual signature system for new quantumproof blockchains, both post quantum and secure in the long term. In the dual signature system, one is for the purpose of complete anonymity, and the second is for the purpose of establishing a credit score for the users.

A first option for a signature is the hash based Winternitz One Time Signature (WOTS+) that offers high level privacy and eliminates the need for state management. This is referred to as "high level privacy" because a new private/public key pair, and hence a new address, is generated for every transaction in the network by the design of the signature scheme for security. Even though Bitcoin claims anonymity for users, there has been a lot of work to deanonymize users by mapping addresses to bitcoin users. This is sometimes because of the post transaction process that is required by some bitcoin retailers for users to send an email after a transaction is posted for follow up services (e.g., as in the case of a purchase or donation). One time signatures provide the advantage of privacy by generating a fresh key pair for each transaction. This is also an interesting application of hash based one-time signatures. The Lamport-Diffie signature was the first hash based signature scheme that involved generating a private/public key pair as follows: For signing a message m, the message m is hashed (typically using a standard hash function of output size 256 bits). Then a private key is generated comprising 256 pairs (corresponding to 0 and 1) of 256 random bits. The public key is the hash of the random bits in the private key. To sign H(m), for each bit of the hash, depending on whether it is 0 or 1, choose the corresponding random 256 bits from the private key. Thus, the signature is a string of 256*256=65536 bits. To verify the signature, the same process is repeated on H(m) using the public key. Then if the result matches the hash of the 256 number of 256 bits random numbers, then the signature is accepted. Otherwise, the signature is rejected. Winternitz One Time Signature is a more efficient hash based signature with shorter signatures and a tradeoff between signature generation time and size using a Winternitz parameter w.

This first option may be different from, and improve upon, normal blockchain. The public key may not be stored in the block because the public key may be computed directly from the signature, which may be further verified using the address. Such a change may save memory storage for the block, which may be substantial memory savings over existing blocks. Such a change may also require that no public key is stored in the network after the currency is spent.

A second option for a signature is the multivariate Rainbow signature scheme that was introduced in 2005. This is considered to be a very fast, efficient, and secure signature scheme, and there have been no efficient practical attacks on the scheme so far, when parameters are chosen appropriately. However, the key sizes used with the Rainbow scheme are typically larger than the currently used Elliptic curve signature or WOTS+. So, a signature method may choose to fix a public/private key pair for a user and generate multiple addresses using this key pair. Such a method may reduce the size of transactions by using one of two techniques. The first technique may comprise not including the public key in the transaction for verification. Instead, a hash table of public keys and corresponding hash values may be maintained. The second technique may comprise the following. When a new Rainbow public key is used for the first time, the public key may be recorded in the block. When the public key is being used a second time, the user may not provide the public key, but rather the location of the previous usage, specifically the block number (i.e., in which block the public key appeared the first time), and/or the location in the specific block, so that nodes and others may locate it and verify the public key is correct and then use the public key to verify the signature for the transaction is correct.

Transactions and blocks in the blockchain are publicly broadcasted and available to everyone in the network. Thus, although this second option offers the same 128 bit security (a p-bit secure scheme is one that requires 2^p operations to attack) as the hash based WOTS+option, this option offers lesser privacy. This is because it is always possible to find the association between the public keys from a particular fixed public key.

Padding the public key: New public keys may be generated by padding the fixed public key. In this case, the user may only need to store one fixed public key and padding bits of fixed length corresponding to each generated public key. So, the wallet size may not be affected much by the increase in key size when using a Rainbow scheme. This helps to generate new public keys for each transaction randomly from the fixed public key. The privacy of the user spending his coins could still be compromised with this padding scheme because the fixed public key is revealed while spending, but this method allows the user to defend against stealing of his coins from quantum attackers when he uses the same fixed public key to create new keys for different transactions.

Credit score: Because this method involves using a single public key to generate multiple addresses using padding and it is possible to associate the addresses to belong to the root public key, it is advantageous to use this association to provide a useful function such as credit score. Such a credit score scheme may operate in the following way. Because transactions and block data are public, users may track and record attempts to double spend or other attack attempts. Further, because public keys may be maintained in a hash table, a link or association may be created between the malicious activity address and the corresponding public key. A penalty may be imposed on a credit score associated with the public key and/or user for each malicious activity recorded. This is particularly more useful for honest users because they can prove their credibility.

In the second signature option, a public key infrastructure (PKI) may also be integrated into the system. Specifically, a trusted third party may issue a certificate for the public key. In this case, the certificate may also be used as the address. By doing so, the network of users may be assured that a user identity can be traced to a real person that may be located by requesting the information from the trusted third party, via a proper legal procedure if necessary. Therefore, the PKI provides the needed credentials for a user on the network. It should be appreciated that even if a certificate is known, it does not necessarily imply that the person is exposed because the trusted third party is generally supposed to keep the identity secret if there is no legal reason to reveal the identity. Also, a person or an organization may be able to apply for multiple certificates for different uses, which may further enhance privacy. The ability to identify a user may be of great value to authorities in terms of future use for collecting tax for transactions using cryptocurrency.

Ultimately, a new blockchain may be built using either the first or the second signature option. Using the first signature option may build a fully enforced anonymous blockchain. Using the second signature option with a PKI may build a traceable and verifiable blockchain with good privacy.

It should be appreciated that in the case of blockchains, a one-time signature is better suited than a Merkle tree based signature like XMSS. Generating a separate public/private key pair and address for every transaction inherently preserves privacy. To achieve at least standard security for a new cryptocurrency the one time signature scheme may be implemented with parameters for 128 bit security, as described in the Internet Engineering Task Force (IETF) standards.

New Proof of Work

A new Proof of Work is introduced that is based on solving nonlinear polynomial equations by guessing random values for one or more of the variables of the equation. The use of multivariable polynomial equation solving for PoW also motivates the scientific community to develop and research on the topic further. Another innovative example of a coin that also was developed with an advantage to mathematical research is Primecoin, which bases its PoW on generating prime numbers of a certain form. Because the PoW is published on the network, the list of such prime numbers become available to the scientific community.

PoW outline: Let n denote the number of variables of a system of equations, and denote the variables as $x_1, \ldots, x_n$. For the PoW, a system of m random Pquadratic polynomials in GF(q) in the n variables may be generated. So, the equations are of the form $\Sigma a_{ij}x_ix_j + \Sigma b_i x_i + c$, where $a_{ij}, b_i, c$ are random values from the field GF(q). Because the purpose of the PoW is to bind the transaction to the block being generated, the transaction data may be embedded into linear and constant terms of the polynomials, and the system of equations may be solved.

The difficulty target is based on the number of equations and variables in the system and may be adjusted based on the number of blocks generated in a specific amount of time. This new PoW may make a blockchain system using this PoW more democratic due to the nature of polynomial solving algorithms and may take away the advantages of current ASIC-based mining techniques.

Padding the Public Key Before Hashing

Although creating a fresh pair of keys for every transaction may be beneficial for security and privacy, storing, managing, and tracking the keys may be difficult for multiple transactions due to the large key sizes of the post-quantum signature schemes. Padding, which may be applicable in both classical and post-quantum cases, may be specifically beneficial for the post quantum case when key sizes are much larger than keys used in existing systems.

By applying a secure padding scheme on the public key and then deriving a new bitcoin address for every transaction, the user that receives the bitcoin may reuse the same public key to create and/or generate different addresses while maintaining anonymity. Such padding offers an alternative to creating a fresh public/private key pair for each transaction without revealing any information on the receiver's identity; however, the sender's identify may still be revealed.

A coin wallet that uses padding for public keys may be implemented using the following method: Let privkey be a fixed private key of a suitable post quantum signature scheme. Derive the corresponding fixed public key pubkey from privkey. Now, the padding bits are randomly generated and appended at the end of the pubkey bits. To obtain the bitcoin address, the method may generate a base58 encoding of the version, a hash160 of the padded public key, and a checksum for the hash and version. The wallet may store the fixed private key and the padding bits for a transaction. When a user decides to spend the coins, the user may reveal the unhashed fixed public key and the padding bits along with other transaction details that may be validated by the network. This has a significant advantage while transitioning to quantum resistant signatures because of the larger key and signature sizes for wallet maintenance and avoidance key reuse because only the padding bits need to be saved for each new transaction, saving on the storage/memory space that would be required for the large keys to be stored. For an n bits public key, a fixed number of padding bits may be added to the end of the public key to create a padded public key. When spending the bitcoins for such an address, the user of the wallet may create a transaction with the unspent output as the input, the full unhashed fixed public key, and the padding bits used to derive the address with the unspent output, and the user may sign with the fixed private key. Because the transaction in formation is public and the bitcoin addresses may be derived from the fixed private key and the padding bits, it may not be necessary to index the padding bits with transactions.

With this change, the input script may now include the signature, unhashed fixed public key, and padding bits for proper validation. The fixed public key may be used to verify the signature. Because bitcoin uses opcodes in the output script for validation, implementing such a procedure may require a new opcode for padding the public key with the padding bits. A new opcode, OP_PAD, may be introduced and used for padding the pubkey with the padding bits, and the input and output scripts may comprise the following data:

---

Input script
[signature]
[pubkey]
[paddingbits]
Output script
OP_PAD
OP HASH160
Hash160(padded pubkey)
OP_EQUALVERIFY
OP_DROP
OP_CHECKSIG

---

Figure 2:
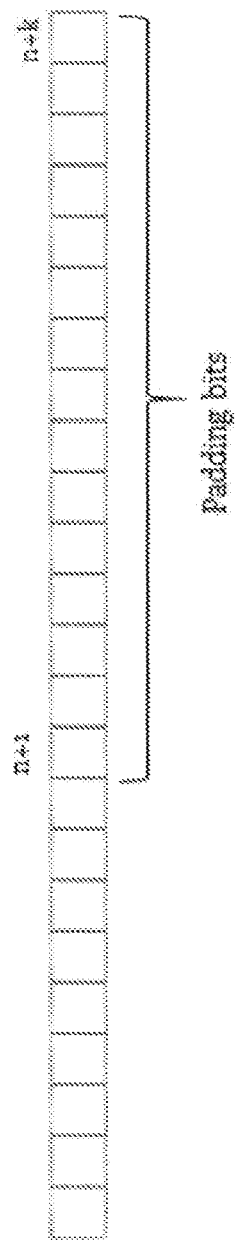
FIG. 2 shows an example padding of a public key.

Revealing the fixed public key may not affect security because each transaction may use a new address created by padding fresh, randomly generated bits with the public key. Hence, for a quantum attacker to create a forged transaction to be validated, the attacker would need to guess the padding bits correctly, which has a probability of $2^t$ for k bits of padding. FIG. 2 shows an example of a public key having a length of n bits with k bits of padding. Grover's algorithm for quantum computers provides a quadratic speed increase over classical algorithms for brute forcing the padding bits. Hence, for post quantum security, at least 256 bits of padding would be needed for 128 bit security. The choice of parameters for the post quantum replacement of the signature scheme should also be chosen at the 128 or 256 bit security level.

It should be appreciated that the padding scheme may only defend users against quantum attacks on reused keys and not on the denial of service type of attack or the eclipse attack described above because both the fixed public key and padding bits may be revealed while spending the coins. A solution to protect against such an attack may be to replace existing ECDSA with quantum resistant signatures. When quantum signatures along with the padding scheme are used instead of reusing keys, an attacker may not be able to compute the private key corresponding to the address even when the fixed public key is revealed. Also, an attacker may not be able to determine the padding bits with non-negligible probability when a user uses the same fixed public key to generate a new address for a transaction.

One disadvantage in the padding scheme is that when a user transfers bitcoins, the user may reveal the user's public key with the padding, and in this case, the user transferring the bitcoin may be essentially revealing the user's online identity in the sense that the user uses the same public key for each transaction. Therefore, padding may only protect the privacy of the receiver of the bitcoin, not both the sender's and receiver's privacy.

Modularization

An additional blockchain design may be to make the signature system and the PoW system in blockchain new, separate, independent modules such that one or both modules may be replaced/substituted with new long term secure post-quantum signature schemes in the future. Such modularization may make the blockchain system very flexible with regard to system updates such that it may easily adapt to future threats.

Additional Improvements

Additional improvements may be made to a general blockchain, including a quantumproof blockchain, that uses a large public key size. One improvement may be to not store a public key in a block, but create a separate file in the system to store the public keys with corresponding addresses. Users may then search for a public key with the corresponding address in such a separate file to verify transactions. Another improvement may be to store a public key in one or a few blocks such that later blocks do not store the public key. Instead, later blocks may refer to the earlier block where the public key is stored (e.g., via the block number of the earlier block) so that users may find the public key by the block number and address to verify a transaction.

Example Environment

Figure 3:
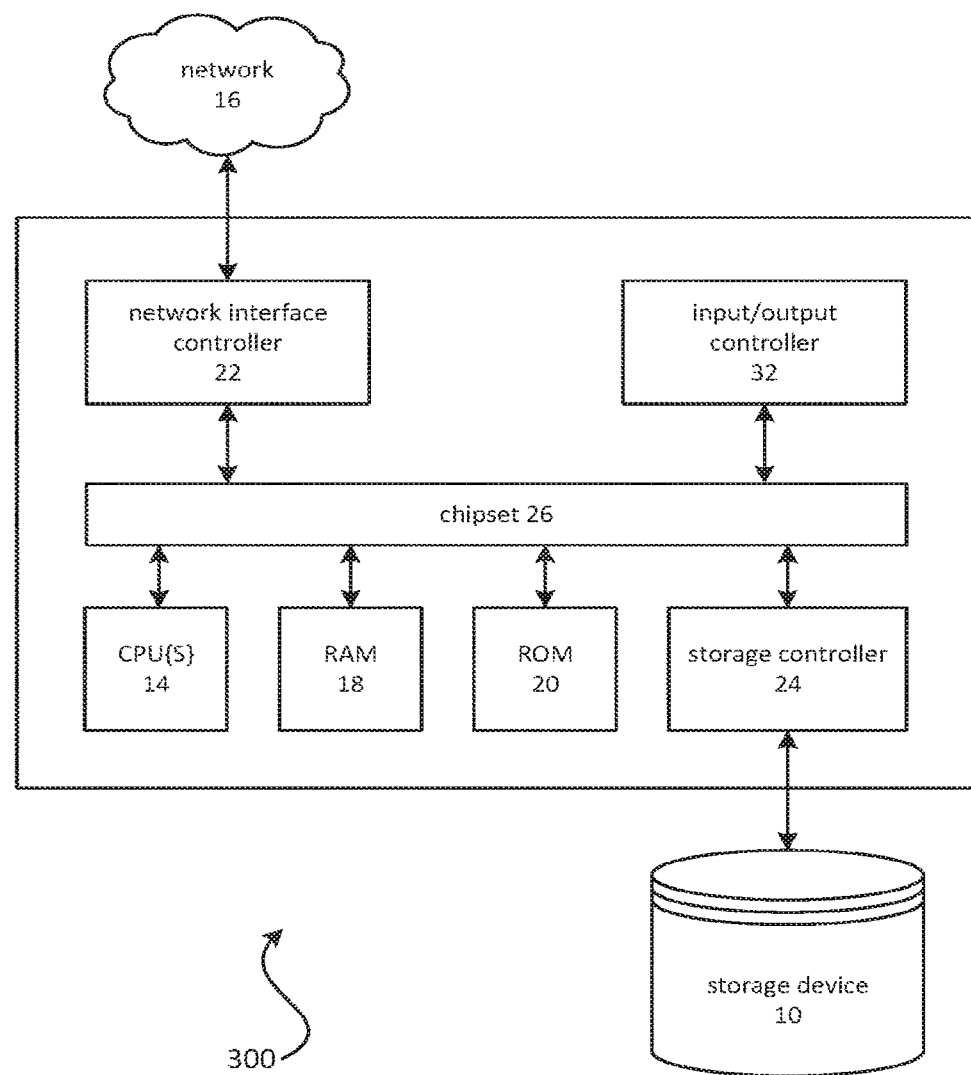
FIG. 3 shows an example computing system.

FIG. 3 depicts a computing device that may be used in various system components, such as any of those described with regard to described processes. The computer architecture shown in FIG. 3 may correspond to a desktop computer, laptop, tablet, network appliance, e-reader, smartphone, or other computing device, and may be utilized to execute any aspects of the users described herein, such as to implement the operating procedures described above.

A computing device 300 may include a baseboard, or "motherboard," which is a printed circuit board to which a multitude of components or devices may be connected by way of a system bus or other electrical communication paths. One or more central processing units ("CPUs") 14 may operate in conjunction with a chipset 26. The CPU(s) 14 may be standard programmable processors that perform arithmetic and logical operations necessary for the operation of the computing device 300.

The CPU(s) 14 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 14 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 26 may provide an interface between the CPU(s) 14 and the remainder of the components and devices on the baseboard. The chipset 26 may provide an interface to a random access memory ("RAM") 18 used as the main memory in the computing device 300. The chipset 26 may further provide an interface to a computer-readable storage medium, such as a read-only memory ("ROM") 20 or non-volatile RAM ("NVRAM") (not shown), for storing basic routines that may help to start up the computing device 300 and to transfer information between the various components and devices. The ROM 20 or NVRAM may also store other software components necessary for the operation of the computing device 300 in accordance with the aspects described herein.

The computing device 300 may operate in a networked environment using logical connections to remote computing nodes and computer systems through a local area network ("LAN") 16. The chipset 26 may include functionality for providing network connectivity through a network interface controller (NIC) 22, such as a gigabit Ethernet adapter. The NIC 22 may be capable of connecting the computing device 400 to other computing nodes over the network 16. It should be appreciated that multiple NICs 22 may be present in the computing device 300, connecting the computing device to other types of networks and remote computer systems.

The computing device 300 may be connected to a mass storage device 10 that provides non-volatile storage for the computing device 300. The mass storage device 10 may store system programs, application programs, other program modules, and data, used to implement the processes and systems described in greater detail herein. The mass storage device 10 may be connected to computing device 300 through a storage controller 24 connected to the chipset 26. The mass storage device 10 may consist of one or more physical storage units. A storage controller 24 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 300 may store data on the mass storage device 10 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 10 is characterized as primary or secondary storage and the like.

For example, the computing device 300 may store information to the mass storage device 10 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 300 may further read information from the mass storage device 10 by detecting the physical states or characteristics of one or more particular locations within the physical storage units.

In addition to the mass storage device 10 described above, the computing device 300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 10 may store an operating system utilized to control the operation of the computing device 300. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 10 may store other system or application programs and data utilized by the computing device 300.

The mass storage device 10 or other computer-readable storage media may also be encoded with computer-executable instructions, which, when loaded into the computing device 300, transforms the computing device from a general-purpose computing system into a special-purpose computer capable of implementing the aspects described herein. These computer-executable instructions transform the computing device 300 by specifying how the CPU(s) 14 transition between states, as described above. The computing device 300 may have access to computer-readable storage media storing computer-executable instructions, which, when executed by the computing device 300, may perform operating procedures described herein.

The computing device 300 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computing device 300 may not include all of the components shown in FIG. 3, may include other components that are not explicitly shown in FIG. 3, or may utilize an architecture completely different than that shown in FIG. 3.

As described herein, a computing node may be a physical computing device, such as the computing device 300 of FIG. 3. A computing node may also include a virtual machine host process and one or more virtual machine instances operating on a physical computing device, such as the computing device 300. Computer-executable instructions may be executed by the physical hardware of a computing device indirectly through interpretation and/or execution of instructions stored and executed in the context of a virtual machine.

Methods and systems are described for improved blockchain security. It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the aforementioned detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to methods, systems, apparatuses and computer program products. It will be understood that processing/processes can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the described processes.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the described processes. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the described processes.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including the following: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

What is claimed:

1. A method comprising:
   maintaining a blockchain hash table comprising a plurality of public keys and corresponding hash values, wherein each public key of the plurality of public keys is fixed and associated with a single user; and
   for each blockchain transaction;
   determining a public key used to generate the blockchain transaction;
   associating, in the blockchain hash table, the blockchain transaction with the public key;
   determining that a blockchain transaction comprises malicious activity;
   determining a public key used to generate the blockchain transaction; and
   associating, in the blockchain hash table, the malicious activity with the public key.

2. The method of claim 1, wherein the malicious activity relates to a bitcoin transaction.

3. The method of claim 1, wherein the malicious activity is a Distributed Denial of Service (DDoS) attack or an eclipse attack.

4. The method of claim 1, wherein the public key is associated with a public key infrastructure (PKI) certificate.

5. The method of claim 1, wherein the public key is a Rainbow public key.

6. The method of claim 1, wherein the blockchain transaction is a financial transaction.

7. A system comprising:
   one or more processors;
   a non-transitory, computer-readable storage medium in operable communication with at least one processor of the one or more processors, wherein the computer-readable storage medium contains one or more programming instructions that, when executed, cause the processor to:
   maintain a blockchain hash table comprising a plurality of public keys and corresponding hash values, wherein each public key of the plurality of public keys is fixed and associated with a single user; and
   for each blockchain transaction:
   determine a public key used to generate the blockchain transaction;
   associate, in the blockchain hash table, the blockchain transaction with the public key;
   determine that a blockchain transaction comprises malicious activity;
   determine a public key used to generate the blockchain transaction; and
   associate, in the blockchain hash table, the malicious activity with the public key.

8. The system of claim 7, wherein the malicious activity relates to at least one of a bitcoin transaction, a Distributed Denial of Service (DDoS) attack, or an eclipse attack.

9. The system of claim 7, wherein the public key is associated with a public key infrastructure (PKI) certificate.

10. The system of claim 7, wherein the public key is a Rainbow public key.

11. The system of claim 7, wherein the blockchain transaction is a financial transaction.

* * * * *